Dec. 19, 1939.   H. C. BOSTWICK   2,183,983
PRESS
Original Filed May 8, 1936   4 Sheets-Sheet 1

INVENTOR
Henry C. Bostwick
Bates, Golrick & Teare
ATTORNEYS

Dec. 19, 1939. H. C. BOSTWICK 2,183,983
PRESS
Original Filed May 8, 1936 4 Sheets-Sheet 2

INVENTOR.
Henry C. Bostwick
Bates, Golrick Jeare
ATTORNEYS.

Dec. 19, 1939.   H. C. BOSTWICK   2,183,983
PRESS
Original Filed May 8, 1936   4 Sheets-Sheet 3
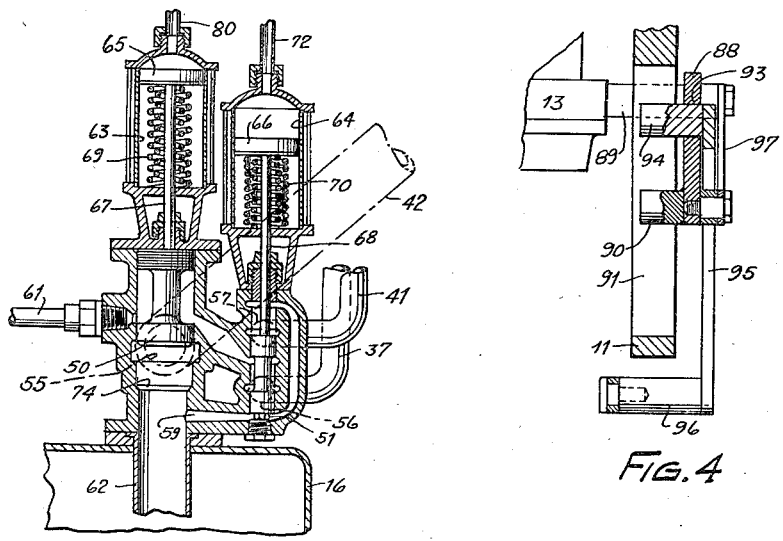
Fig. 3
Fig. 4
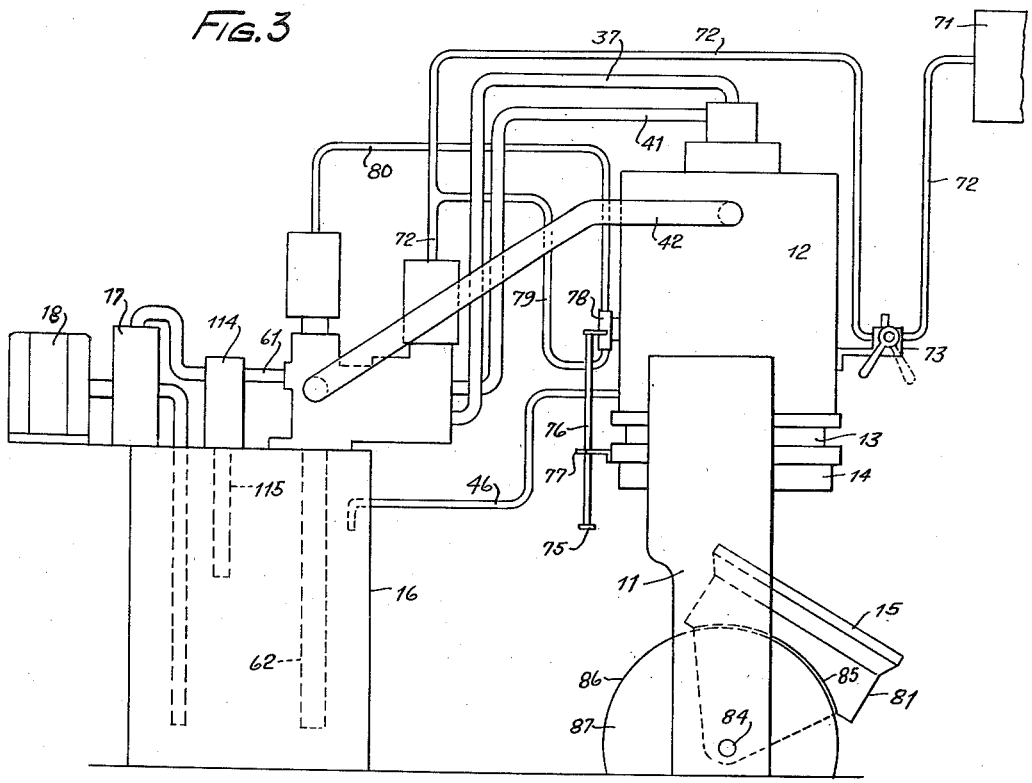
Fig. 5
INVENTOR.
Henry C. Bostwick
BY Bates, Golrick & Teare
ATTORNEYS.

Dec. 19, 1939.　　　H. C. BOSTWICK　　　2,183,983
PRESS
Original Filed May 8, 1936　　　4 Sheets-Sheet 4
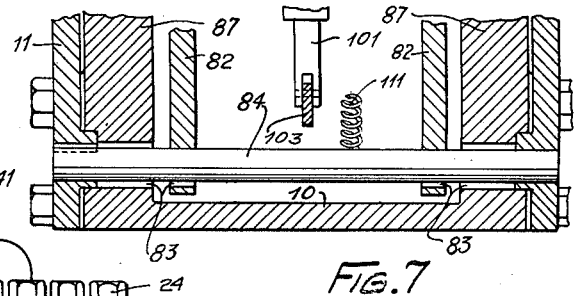
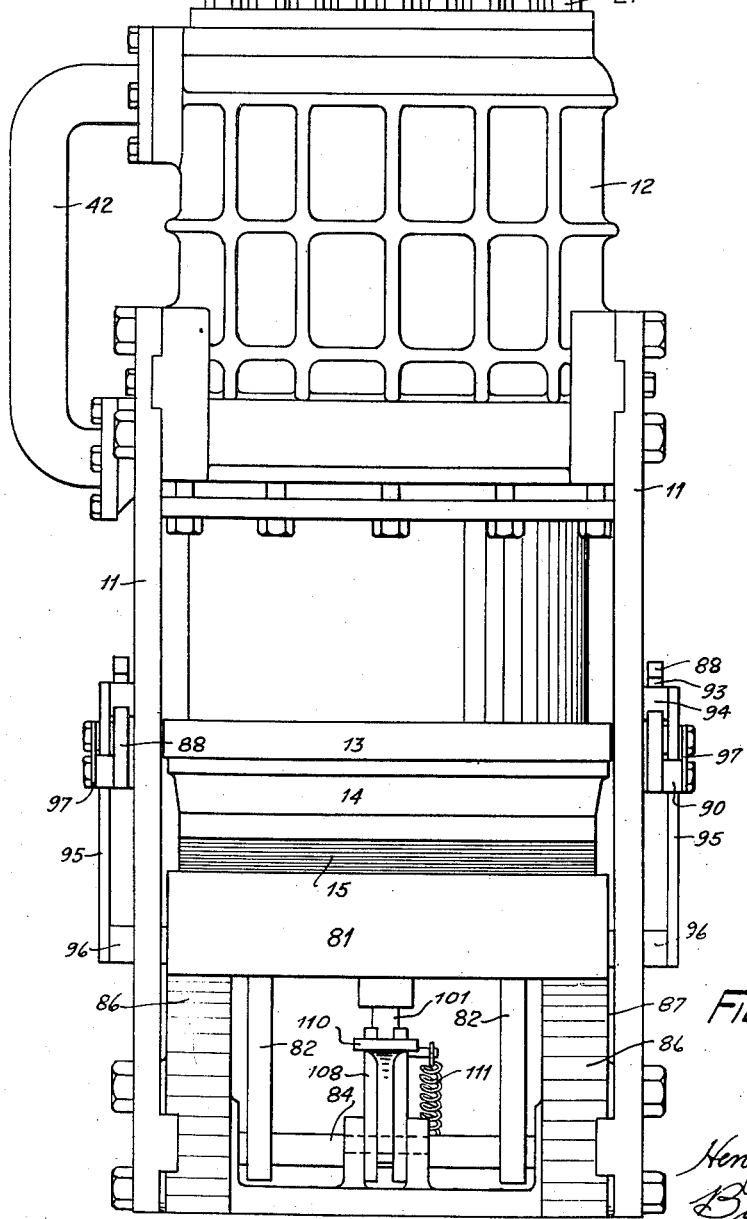
INVENTOR.
Henry C. Bostwick
Bates, Goldrick & Teare
ATTORNEYS Patented Dec. 19, 1939

2,183,983

UNITED STATES PATENT OFFICE 2,183,983

PRESS

Henry C. Bostwick, Akron, Ohio, assignor to Akron Standard Mold Company, Akron, Ohio, a corporation of Ohio Application May 8, 1936, Serial No. 78,689
Renewed October 10, 1939

10 Claims. (Cl. 18—16)

This invention relates to presses that are adapted to be used in molding articles from rubber or plastic compounds, and relates particularly to those presses, which are termed "heavy duty". Presses of this type are utilized in the forming of many articles such as steering wheels for motor vehicles, but heretofore a fluid pressure between two thousand and three thousand pounds per square inch has been used for operating the ram. Such high pressures are objectionable, however, because of the expense incurred in maintaining leak-proof joints, and because of the weight and character of castings that have been required to withstand the high pressure.

An object of my invention, therefore, is to make a "heavy duty" press that is capable of exerting a force of the required heavy duty amount without necessitating the use of the high pressures hereinbefore set forth. In this connection, my invention includes a press construction by means of which the same force may be obtained by an operating fluid pressure of substantially one-half (½) that heretofore used.

Other objects of my invention include mechanism, by means of which the mold may be readily charged prior to the pressing operation and unloaded at the completion of it; mechanism for automatically tilting one of the heads to facilitate the loading and unloading of the mold without transmitting the molding stresses through the tilting mechanism; and an arrangement of valve devices by means of which the press may be operated by relatively low force during its article approaching movement, and a relatively high force during the article forming movement, the transition from the application of low to high force occurring without any delay in the ram movement.

Figure 1:
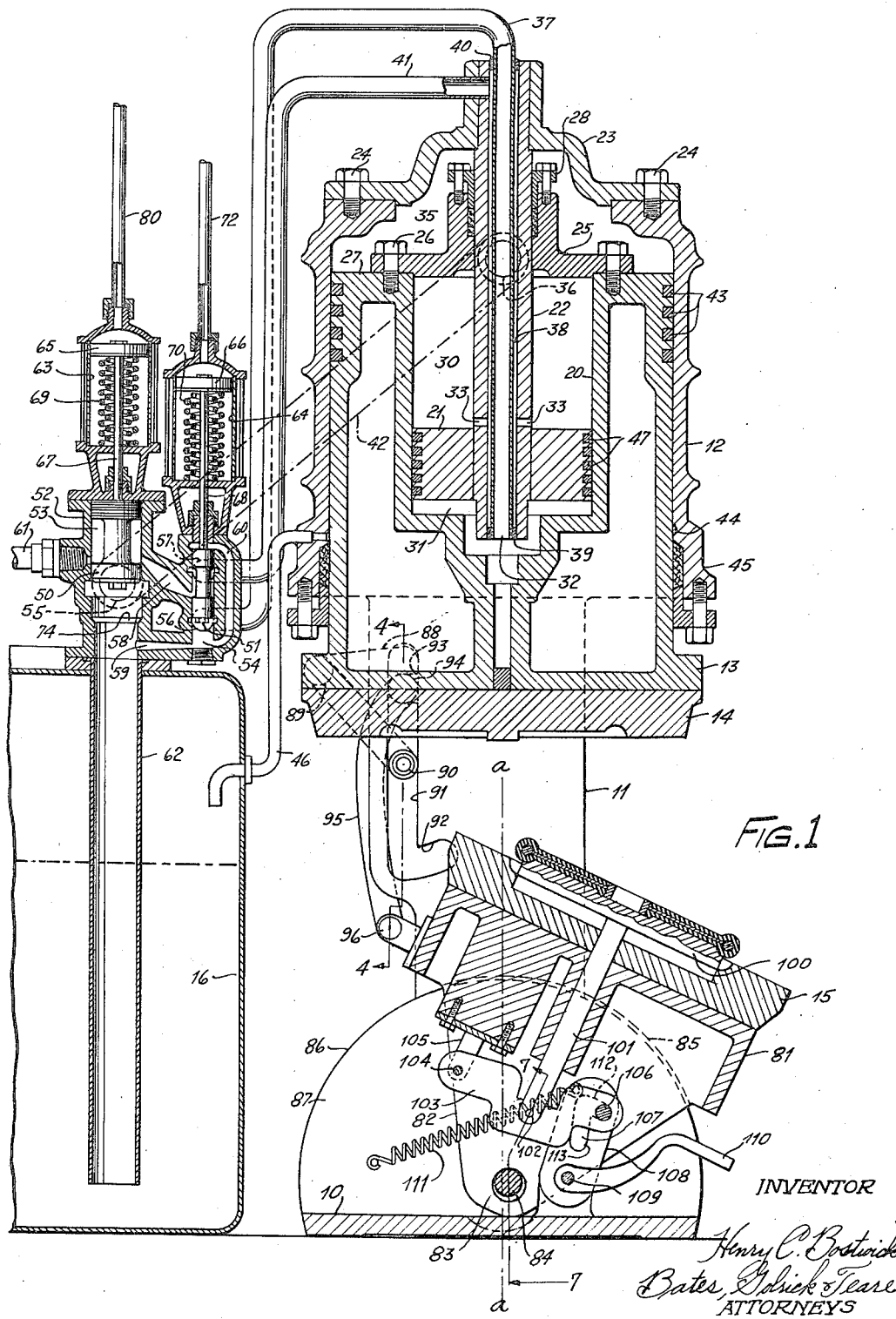
Figure 2:
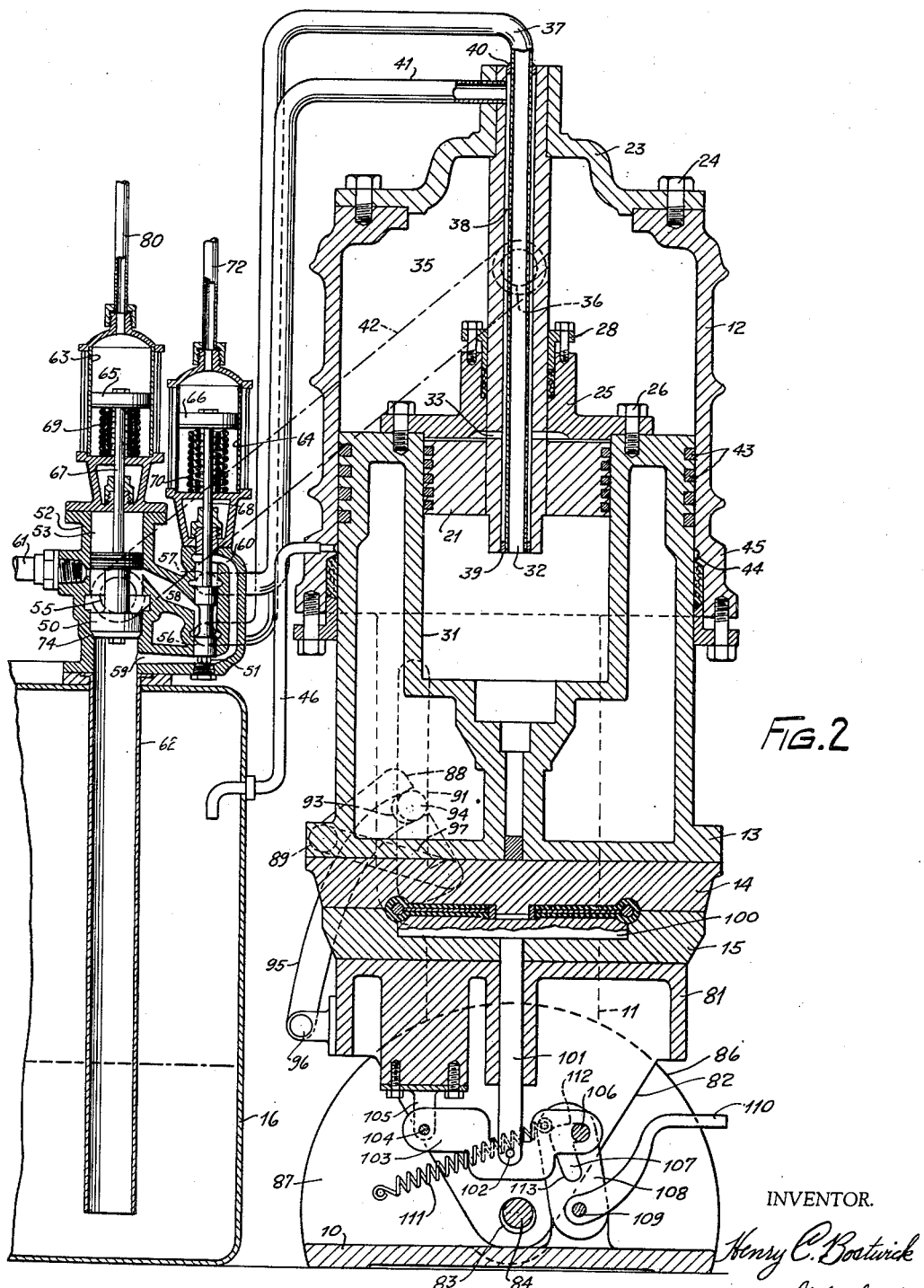

Referring now to the drawings, Fig. 1 is a vertical section through a press embodying my invention showing the press in article receiving position; Fig. 2 is a similar sectional view, showing the press in molding position; Fig. 3 is a section through a valve mechanism illustrating the position of the valves different from that indicated in Figs. 1 and 2; Fig. 4 is a section taken on the line 4—4 in Fig. 1; Fig. 5 is a diagrammatic view of the press and operating connections therefor; Fig. 6 is a front view of the press, and Fig. 7 is a section taken on the line 7—7 in Fig. 1.

Referring first to Fig. 1, the frame of the press is indicated as having a base 10, and side plates 11. The side plates support a stationary cylinder 12, in which a ram 13 is mounted for reciprocation. The ram carries a molding head 14 which is adapted to cooperate with a tilting head 15. In the embodiment shown, the ram is adapted to be fluid-operated and preferably the operating means comprise oil under pressure. The oil may be stored in a container 16 and may be forced into the ram by a pump which is indicated in general at 17, and which is adapted to be operated by an electric motor 18. Suitable valve devices and mechanism for operating the same are interposed between the pump and the ram, and will hereafter be described in detail.

To obtain delivery of maximum force by a ram of minimum size and with minimum unit pressure, I have so designed the ram that pressure may be exerted thereon on an area greater than the cross-sectional area of the ram. This, I accomplish by utilizing an auxiliary cylinder 20 within the ram, and by positioning a reactionary member in the form of a stationary piston 21 therein. The piston may be supported by a conduit 22 which in turn is carried by a cap 23. The cap forms a closure for the cylinder 12 and is attached thereto by securing members 24. One wall of the auxiliary cylinder is formed by a cap 25 which is shown as being attached by securing members 26 to an end wall 27 of the ram, and which is also shown as carrying a stuffing box 28 for preventing the flow of liquid between the movable cap 25, and the stationary conduit 22.

The construction described provides two fluid chambers within the auxiliary cylinder, one of such chambers being on one side of the stationary piston 21 and being designated 30 and the other being on the opposite side of the piston, and being designated 31. The chamber 31 is entirely closed except for the port 32 by means of which liquid may flow into and out of it. Similarly the chamber 30 is sealed except for the ports 33, which extend laterally through the conduit 22. There is a third fluid chamber, which is designated 35, and which comprises the space between the cylinder head 23, and the adjacent end of the ram. The chamber 35 is likewise sealed except for the port 36, which is in the side wall of the stationary cylinder 12. All of the ports described constitute inlet and outlet passages by means of which fluid is caused to flow into and out of the respective chambers.

To conduct fluid into the chamber 31, I have shown a conduit 37, which extends through the conduit 22 and in spaced relation thereto. The outer diameter of the conduit 37 is sufficiently small with reference to the inner diameter of the conduit 22 that the intervening space 38 provides a conduit for the flow of liquid into and out of the chamber 30. To maintain the chambers in sealed relationship each end of the conduit 38 is sealed, as is indicated at 39 and 40 respectively.

Fluid which passes through the conduit 37 and into the chamber 31 is utilized for initiating the downward movement of the ram, while fluid which enters the conduit 38 through the conduit 41 is utilized for filling the chamber 30 so as to raise the ram. Fluid that enters the chamber 35 through the conduit 42 and port 36 is utilized in conjunction with that in the chamber 31 for exerting molding pressure upon the ram.

Leakage from the chamber 35 may be prevented by packing rings 43 but any leakage which may occur is trapped within an annular space 44 in a stuffing box 45, which is placed at the lower end of the stationary cylinder. Accumulated liquid in such space may be led through a drain 46 to the container 16. To seal the chambers 30 and 31 suitable packing rings 47 are shown in a stationary piston 21.

The valve devices which are interposed between the pump and the ram are connected to the conduits, which supply liquid to the chambers 30, 31 and 35. There are preferably two of such valves, one of which is indicated at 50 and the other of which is indicated at 51. For convenience of manufacture the two valve devices are shown as having a common body 52 which has a chamber 53 in which the valve 50 operates and a chamber 54 in which the valve 51 operates. The chamber 53 has a port 55 to which the conduit 42 is connected while the chamber 54 has ports 56 and 57 to which the conduits 37 and 41 are respectively connected. In addition, the body has spaced passageways 58 and 59 which connect the chambers 53 and 54 respectively. Moreover, the body has a by-pass 60 which extends lengthwise of the valve 51 and communicates with the ends of the chamber 54. The body may also have provision for receiving an inlet conduit 61 that is connected to the pump and a second conduit 62 that extends into the container and operates both as a supply and discharge pipe. The function of these various passageways and chambers will hereinafter be described in connection with the operation of the press.

Surmounting the valve body, I have shown cylinders 63 and 64, in which pistons 65 and 66 are adapted to operate respectively. The piston 65 is connected by rod 67 to the valve 50 while piston 66 may be connected to the valve 51 by a rod 68. Suitable springs 69 and 70 operate to urge the pistons 65 and 66 respectively in one direction, while fluid under pressure is adapted to engage the pistons for moving them in the opposite direction. Thus, when fluid pressure is not acting upon the pistons, the valves are in the position shown in Fig. 1, at which time the press is ready for operation.

In Fig. 3, the position of the valve 51 has been altered by the introduction of fluid under pressure against the piston 66, and accordingly, the valve 51 has been moved downwardly, during which movement, the port 57 has been closed, and the port 56 has been opened. In the position shown in Fig. 1, the port 56 is closed, while the port 57 is opened to the passage of liquid under pressure.

The downward movement of the valve 51 initiates the downward movement of the ram by stopping the flow of oil into the chamber 30 and permitting the flow into the chamber 31, but to permit the travel of the ram, it is necessary to discharge the liquid from the chamber 30. This is accomplished by opening the port 57 to communication with the by-pass 60, so that oil is free to flow out of the chamber 30 through the conduit 38, conduit 41, port 57, by-pass 60, passageway 59, and into the conduit 62, the flow continuing so long as the ram is moving downwardly. The initial movement of the piston 66 may be caused by air under pressure, the source of supply being indicated in Fig. 5, at 71 from which a conduit 72 extends to the cylinder 64. A manually operable valve 73 may be positioned in the conduit adjacent the front of the press where it is readily accessible to an operator.

As the ram starts downwardly under the increase of pressure in the chamber 31 and the release of pressure in the chamber 30, a partial vacuum is created in the chamber 35. I utilize such vacuum for inducing a flow of oil into the chamber 35, so as to have it substantially filled with liquid at the time the greatest force is required. Accordingly, the valve 50 is retained in the position shown in Fig. 1 until the large force is needed. In the position shown in Fig. 1, the port 55 is closed to the source of fluid under pressure, but is open for the flow of oil from the tank 16 upwardly through conduit 62, port 55, conduit 42, port 36 and into the chamber 35. As oil is flowing upwardly in the conduit 62, it follows that oil which is flowing into the same conduit, through passageway 59 mingles with that flowing into the pipe 62, and flows with it into the chamber 35.

The ram thus moves downwardly under the force exerted within the chamber 31 until a predetermined point is reached in its travel, at which time the valve 50 is moved automatically to the position shown in Fig. 2, wherein it engages the seat 74 thereby stopping the upward flow through the pipe 62, and opening the port 55 to the source of fluid pressure. Thereafter, oil is pumped into the chamber 35, and inasmuch as the position of the valve 51 has not been changed, oil is likewise flowing under pressure into the chamber 31. Accordingly, the liquid at such time is exerting pressure on an area that is greater than the cross-sectional area of the ram, and consequently, greater force can be delivered under a given unit pressure than can be delivered by a ram, in which pressure is exerted only against one end thereof.

The point at which the flow of oil through the conduit 42 is changed from a vacuum to a pressure flow may be determined by the position of the reciprocating head with reference to the tilting head. In Fig. 5, for example, the predetermined point for changing the pressure is designated by an abutment 75, which is mounted at the lower end of a rod 76. A plate 77 that is mounted on the head is adapted to engage the abutment 75 in its downward travel, and to move the rod 76 downwardly with it thereby operating a valve 78. The valve 78 is connected on its inlet side through conduit 79 to the air supply conduit 72, and on its discharge side through a conduit 80 to the cylinder 63. Normally, the valve is urged to closed position as by a spring (not shown) at which time, air in the conduit 80 is vented to the atmosphere, but when the rod 76 is moved downwardly, the valve is opened and the vent is closed, thereby allowing air under pressure to flow into the conduit 80, and thence into the cylinder 63 above the piston 65. In this way, the piston 65 is moved downwardly and the position of the valve 50 is shifted from that shown in Fig. 1 to that shown in Fig. 2.

In the normal operation of the press, the ram travels downwardly under pressure that is exerted in the chamber 31 for the major portion of its movement, and then travels downwardly under the combined force that is exerted in the chambers 31 and 35, during the remaining portion of its movement.

The tilting head that cooperates with the reciprocating head is adapted to be so supported on the frame that molding stresses cannot be imparted to the tilting mechanism. This enables the use of comparatively light tilting mechanism in a heavy duty press. I accomplish this result by mounting the head upon a table 81, which has two arms 82 that extend downwardly, and that are provided with openings 83 through which a pivot bar 84 extends. The bar in turn may be supported at its ends in the frame 11. The under-face of the table has two arcuate surfaces 85, which are adapted to bear against the complementary shaped surfaces 86 on stationary abutments 87. These abutments extend upwardly from the base in spaced relationship, and each has a relatively wide face upon which the table is adapted to rest. The abutments may be cast integrally with the base, or may be connected to it in any suitable manner.

Each abutment is preferably so positioned with reference to the frame that the axis of the ram passes through a vertical plane that extends through the mid-portion of the two abutments. Such plane is indicated by the broken line $a$—$a$ in Fig. 1, and in such figure, it will be observed that the axis of the pivot 85 is off-set forwardly with reference to the plane $a$—$a$. Accordingly, as the table is tilted forwardly, it is lifted off its trackway and supported upon the pivot bar, so as to reduce the frictional resistance to a minimum. There is sufficient clearance between the pivot bar 84 and the openings 83 to prevent the transmission of molding stresses through the pivot bar when the press is in use.

To tilt the table 81 automatically upon the operation of the ram, I provide a system of linkage which interconnects the table and ram, and which operates in conjunction with a cam slot to operate the table at the proper time, so as to assure clearance between the two moving heads. One form of mechanism for accomplishing the tilting movement comprises a triangular shaped plate 88, which is pivotally connected at 89, adjacent one apex thereof to the ram. The plate carries a stud 90 which is adapted to project into a cam-slot in the frame, the slot being indicated as having a vertically extending portion 91, and a laterally extending portion 92. The plate is also shown as having a slot 93, which extends inwardly from one side thereof, and which loosely embraces a stud 94 that is carried by the upper end of a link 95, the lower end of which is pivotally connected at 96 to the table. The link is held in operating relationship to the plate by means of a bar 97, which is carried by the plate adjacent the outer ends of the pivot pin 89 and the stud 90, as shown in Fig. 4.

The various parts of the linkage mechanism are so interconnected that when the press is in the position shown in Fig. 1, both of the studs 90 and 94 are in the vertical reach of the cam slot, whereas when the press is in the position shown in Fig. 2, the stud 94 is in the vertical reach, but the stud 90 is in the horizontal reach, the plate 88 having turned about the stud 94 as a pivot to permit the stud 90 to move it into the horizontal reach. The function of the lateral slot 92 is to allow sufficient time for the ram on its upward stroke to clear the table before the tilting commences. Similarly, the linkage system completes the tilting movement to molding position at the start of the downward travel of the ram, so that the article is in position for the molding operation before the stud 90 reaches the bottom of the vertical slot 91.

The press is shown as having a knock-out which operates to loosen the molded article from the mold. It may consist of a knock-out plate 100, which is positioned beneath the molded article and which is supported upon a bar 101. The bar in turn is shown as extending through the table, and as being pivotally connected at 102 to a link 103, which in turn is pivotally connected at 104 to a bracket 105 that is attached to the bottom of the table. The link supports a stud 106 which projects laterally therefrom and is adapted to extend laterally into a cam slot 107 in a plate 108. The plate in turn is shown as being pivotally mounted at 109 upon the base of the machine. A foot-operated lever or pedal 110 may be rigidly connected to the plate, while a spring 111 may be used for normally urging the plate in one direction. The spring tends to hold the plate rearwardly so as to maintain the stud 106 against the forward wall of the cam slot, and so when the press is in the position shown in Fig. 2, the stud occupies the lateral reach 112 of the cam slot at which time the knockout plate bears against the lower mold head. As the head is moved, however, to the position shown in Fig. 1, the knock-out plate is automatically raised, so long as the stud 106 remains in the horizontal reach of the cam-slot, and in this way, the article is automatically loosened from the mold. To move the knock-out plate back to original position, it is only necessary for an operator to depress the pedal 110 against the tension of the spring 111 until the stud 106 occupies vertical reach 113 of the cam slot, at which time the stud is free to drop downwardly in the cam slot.

The length of the vertical reach is such that the knock-out plate is seated in the mold before the stud reaches the bottom of the slot. When the head is tilted back however, to the pressing position, the stud is automatically moved upwardly until by the time the table is in horizontal position, it clears the vertical reach, whereupon the spring 111 pulls the plate 108 rearwardly to the position shown in Fig. 2.

Briefly, the operation of my press is as follows: Assuming that the press parts are in the position shown in Fig. 1 and that an article to be manufactured is laid in the mold head 15, then the operator depresses the pedal 110 so as to release the knock out plate and thereby to allow the article to find its lowermost position in the mold. At the time the article is placed in the mold, the valves 50 and 51 are in the position shown in Fig. 1, but as soon as the valve 73 is opened, air under pressure flows into the cylinder 64 and thereby moves the valve 51 to the position shown in Fig. 2. It is to be understood that the pump 17 has been constantly operating, and that while the press has been idle, the oil moved by the pump has been flowing through the by-pass 114, and conduit 115 to the tank. As soon, however, as the valve 51 is shifted from the position shown in Fig. 1 to that shown in Fig. 2, oil flows through the supply pipe 61 into the valve chamber 53, through the passageway 58, through port 56, pipe 37 and into the chamber 31. So long as oil is in the chamber 30 and is prevented from escaping, the ram cannot be forced downwardly, but when the valve 51 is moved from the position shown in Fig. 1 to that shown in Fig. 2 the port 57 is uncovered, and hence oil is permitted to flow from the chamber 30 through passageways 33, conduit 38, pipe 41, port 57, valve body passage 60, passage 59, and thence into conduit 62, where it intermingles with oil that is flowing upwardly from the tank 16 and into the chamber 35. The upward flow in the conduit 62 is caused by the partial vacuum which is created in the chamber 35 by the initial downward movement of the ram; the net result being that the chamber 35 is being filled automatically while the ram is moving downwardly.

While the ram is moving downwardly under the influence of pressure within the chamber 31, the linkage mechanism which connects the ram to the table 81, tilts it to molding position, at which time, the table together with its associated molding head, is supported entirely by the upper surfaces of the abutments 87, and the arrangement of linkage is such that the tilting head is in molding position before the reciprocating head engages the article to be molded.

As the ram travels downwardly, the plate 77 carried thereby, engages the abutment 75, and thereby trips the valve 78, so as to allow air under pressure to enter the valve cylinder 63 and thereby to move the valve 50 from the position shown in Fig. 1 to that shown in Fig. 2, thereby sealing off communication between the port 55 and the inlet conduit 62, and opening communication between the pump and the port 55. Oil thereupon flows under pressure through the port 55, pipe 42 and into the chamber 35 so that fluid under pressure now occupies both the chambers 31 and 35, and inasmuch as oil has been flowing into the chamber 35 before the valve 50 was shifted, there is no sudden inrush of liquid under pressure into the chamber 35 that would be apt to cause a liquid hammer. Furthermore no time is lost in filling the chamber 35. As the weight of the ram aids it in moving downwardly, only low force is required to move it until the molding action occurs; at such time, force is exerted jointly in the combine chambers 31 and 35, and is maintained therein until the molding operation is completed.

At the completion of the molding operation, the operator reverses the valve 73 and thereby shuts off the source of air supply, and vents the air by a vent (not shown) on the discharge side of the valve. This allows the springs 69 and 70 to move the valves 50 and 51 back to the position shown in Fig. 1, wherein the flow of oil to the chambers 31 and 35 is shut off, and the flow of oil to the chamber 30 is started. The valve operation which shuts off the flow to the chambers 31 and 35 automatically opens communication between such chambers and the storage tank, and consequently oil may flow back into the tank as the ram is moved upwardly under pressure of the oil that is flowing into the chamber 30.

An important advantage of my invention is the fact that I obtain a heavy duty press than has a relatively small size ram and that operates at a relatively low fluid pressure, as compared to those heretofore used. An additional advantage is the fact that the press has a tilting head, together with a knock-out plate, which are operated automatically upon movement of the reciprocating head. A further advantage is the fact that movement of the ram may be initiated with relatively low force, and that high force is required only for a relatively short period of time. This feature contributes materially to the economical operation of the press.

I claim:

1. A press having a reciprocating head, and a laterally movable head, means for interconnecting the heads so as to move them in unison into and out of registration with each other, said means including a plate that is pivotally mounted on one of the heads, and a link that is pivotally mounted on the other of said heads, studs carried by the plate and link respectively, and a cam slot for guiding the studs.

2. A press having in combination, a frame having a cam slot therein, a head mounted for reciprocation in the frame, a second head mounted for oscillation in the frame, means for moving the oscillatable head into and out of registration with the reciprocating head, said means including a mechanical connection, a portion of which extends into the cam slot and is guided for movement thereby.

3. In a press, the combination of a movable ram, a stationary casing therefor, a pressing head carried by the ram, three fluid receiving members for actuating the ram, a source of fluid pressure supply, a storage tank, conduits connecting the source of supply and the tank to each of the chambers, valve devices in the conduits, means for operating the devices to direct the passage of fluid into one of the chambers under pressure while exhausting the liquid from a second chamber and simultaneously introducing the exhausted liquid by a partial vacuum into the third chamber during one portion of the stroke of the ram, and into the tank during the remaining portion of said stroke of the ram, and means for operating one of said valve devices before the ram reaches the end of its stroke to change the flow of liquid into the third chamber from a vacuum supply to a pressure supply.

4. In combination, a frame, a movable mold supported on the frame, a knock-out device for the mold including a knock-out member and mechanism for actuating the member upon movement of the mold, said mechanism including two interconnected members, one of which is pivotally connected to the mold member and to the knock-out member, and the other of which is pivotally connected to the stationary support, there being a pin and slot connection between the two last named members.

5. In a press the combination of a tiltable pressing member, a knock-out member movably mounted thereon, a stationary support for the pressing member, mechanism interconnecting the support and pressing member for actuating the knock-out member, said mechanism including two interconnected levers, one of which has a cam slot therein, and the other of which has a stud projecting into the slot, and a foot treadle for selectively moving the levers with relation to each other so as to alter the position of the stud within the slot to permit resetting of the knock-out member.

6. A press comprising in combination, a frame having cam slots therein, an upper reciprocating pressing member, a lower tiltable pressing member, means for moving the tilting member into pressing position during the initial movement of the reciprocating member, said last named means comprising a plate pivotally mounted on the reciprocating member, a link pivotally mounted on the tiltable member, and studs carried by the plate and link respectively and received and guided by the cam slots in said frame, fluid operated means for exerting force upon the reciprocating member to initiate its movement including a pair of valves, and mechanism operable automatically by the movement of the reciprocating member to actuate said valves in a manner to increase the force that is exerted upon the reciprocating member during the time that the molding members are exerting pressure against the article to be formed.

7. A press having a main cylinder, a ram movable therein, the ram having an auxiliary cylinder therein, a reactionary member carried by the casing and forming two chambers within the auxiliary cylinder, means for introducing fluid under pressure into one chamber of the auxiliary cylinder, means for simultaneously discharging fluid from the other chamber of the auxiliary cylinder into the main cylinder to initiate movement of the ram, and means for automatically introducing fluid under pressure into the main cylinder so as to augment the force that is exerted upon the ram during the final period of its travel in one direction.

8. A knock-out device for a press comprising in combination, a tiltable mold member, a knock-out member movably supported thereon, mechanism operable upon tilting movement of the molding member to move the knock-out member to knock-out position, said mechanism including a pair of pivoted links, one of which has a cam slot and the other a stud extending into the slot and guided thereby, a spring acting on one of the links to normally hold the stud in knockout position in the slot, and a manually actuated member adapted to move the link having the cam slot against the force of the spring to shift the stud to reset position within the slot thereby permitting the knock-out member to return to the reset position upon the mold member.

9. In a press, the combination of a reciprocating head having three fluid chambers associated therewith, a source of fluid under pressure, an individual conduit communicating with each of said chambers, valve means opening into each of said conduits for directing the flow of fluid under pressure into one of the chambers while simultaneously permitting the second chamber to be exhausted at atmospheric pressure and the third chamber filled by suction during the initial movement of the head, a trip device actuated by a predetermined movement of the head to change said valve means to direct the flow of fluid under pressure simultaneously into the first and third chambers while exhausting it from the second during the pressure stroke of the head, and manually controlled means for changing said valves to direct the flow of fluid under pressure into said second chamber and to simultaneously exhaust fluid from the first and third chambers at atmospheric pressure during the return stroke of said reciprocating head, the fluid pressure being both introduced and exhausted through the same individual conduits connecting to the respective chambers.

10. In a press, the combination of a reciprocating ram, a main cylinder for the ram, a fluid receiving chamber within the cylinder adjacent one end of the ram, an auxiliary cylinder within the ram, reactionary means supported by said main cylinder and adapted to divide said auxiliary cylinder into two chambers, a source of fluid pressure supply, a storage tank apart from said main cylinder, an individual conduit connecting each of the three chambers with the source of fluid supply and tank respectively and valve devices within the conduits whereby during certain settings of the valves fluid pressure is directed to one of the chambers in the auxiliary cylinder to initial movement of the ram, and upon a predetermined movement of the ram the setting of said valve devices is changed automatically to simultaneously direct fluid pressure to two of said chambers during the pressure stroke and to exhaust fluid at atmospheric pressure from the third chamber during such pressure stroke, the fluid pressure being both introduced and exhausted through the same individual conduits connecting to the respective chambers.

HENRY C. BOSTWICK.